(No Model.)
P. W. STANFORD.
AUTOMATIC TIRE INFLATER.
No. 540,519. Patented June 4, 1895.
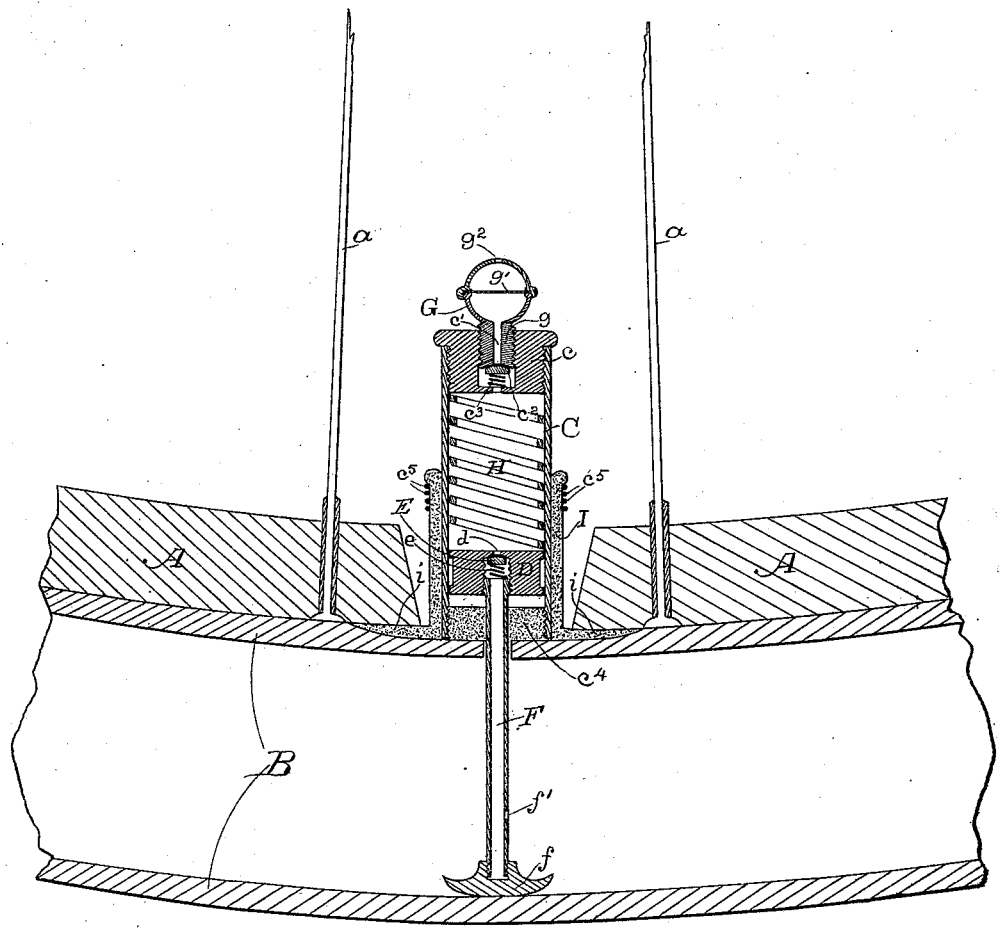
Witnesses,
Inventor,
Philip W. Stanford
By Dewey & Co.
Attys

UNITED STATES PATENT OFFICE.

PHILIP W. STANFORD, OF NEW YORK, N. Y.

AUTOMATIC TIRE-INFLATER.

SPECIFICATION forming part of Letters Patent No. 540,519, dated June 4, 1895.

Application filed March 25, 1895. Serial No. 543,134. (No model.)

*To all whom it may concern:*

Be it known that I, PHILIP W. STANFORD, a citizen of the United States, residing in the city and county of New York and State of New York, have invented an Improvement in Automatic Tire-Inflaters; and I hereby declare the following to be a full, clear, and exact description of the same.

My invention relates to that class of automatic bicycle-tire inflaters in which the necessary pumping operation is dependent upon and gained by the slight compression of the tire at the point of its contact with the ground.

My invention consists of the constructions and combinations of devices which I shall hereinafter fully describe and claim.

The necessity for an automatic tire inflater is one which has been long recognized, but the difficulty, heretofore, has been the application of the complex devices and their attendant weight, the latter objection being a serious one, as the tendency, at present, in bicycle manufacture, is to reduce the weight by every possible means.

Complexity of mechanism and increase of weight are noticeably attendant upon automatic inflating devices, in which the power to operate the pump is derived by gearing up to the axle or hub of the wheel, and simplicity is sacrificed in those devices which involve the manufacture of a special tire containing compressible air bulbs forming the pumping mechanism, and also those in which, while the power is derived from an actuating rod operated by the compression of the tire at its point of contact with the ground, said rod, instead of operating in the pump directly, and serving also as a piston rod, is a separate and independent piece connected with the pump mechanism by intervening levers necessitating special attachments, and necessarily increasing the weight. All these difficulties my invention is intended to overcome by simplifying the parts to the utmost and reducing the weight and size to a minimum.

Referring to the accompanying drawing for a more complete explanation of my invention, the figure is a section of my automatic tire-inflater, showing it applied to the rim and tire of a wheel, which are shown in longitudinal section.

A is the rim of a bicycle wheel having the spokes $a$. B is the pneumatic tire of said wheel.

C is the cylinder of an air pump in which operates a piston D having a port $d$ controlled by a valve E which is, itself, controlled by a spring $e$. Secured to the piston D is a hollow piston rod F which passes downwardly through the inner wall of the pneumatic tire B, and has upon its lower end a foot-piece $f$ which normally lies against the inner surface of the outer wall of said tire. The hollow piston rod has an air exit port $f'$ communicating with the interior of the tire B.

In the head $c$ of the cylinder C is a port $c'$ which is here shown as formed in the plug $g$ of the dust filter G, said plug being screwed into the head $c$, and having its port $c'$ controlled by a valve $c^2$ which is, itself, controlled by a spring $c^3$.

Within the cylinder C and between the head $c$ thereof and the piston D is a spring H which returns said piston.

The connection between the piston and the wheel consists of a flexible sleeve I encircling and binding or bound upon the cylinder, said sleeve having a foot flange $i$ which extends into and is clamped within a space formed between the outer surface of the rim A and the inner wall of the tire B. This sleeve may be of any suitable flexible material, preferably of rubber.

The piston rod F extends through a packing head $c^4$ in the bottom of the cylinder C, which said head may be of any suitable material to form a packing, such, for example, as leather, as it will expand under moisture and will not deteriorate by contact with oil. This connection of the cylinder with the wheel is a flexible one and will allow the parts to yield or bend before any unequal or side strain imposed upon the piston rod F and thereby avoid cramping of the parts or failure of operation.

In the dust filter chamber G is located a filtering diaphragm $g'$ of any suitable material adapted to arrest the passage of dust. The diaphragm is best formed in a sheet, the edges of which are clamped between the adjacent flanges of the two hemispherical halves into which the filtering chamber G is formed, said halves being screwed together as shown. The filtering chamber has an air inlet $g^2$ in its top.

The operation of the device is as follows:

Each time the tire meets the ground and is compressed at the point at which the foot $f$ of the piston rod F lies, said piston rod is forced upwardly, which movement causes the downward movement of the valve E, thereby opening the port $d$ and allowing the air, which is in the cylinder, to pass down through said port, and by the valve, into the hollow piston rod and out through the vent $f'$ and into the tire. In this upward movement of the piston, the valve $c^3$ is closed by being forced upwardly against its seat, thereby closing the port $c'$. Upon the downward movement of the piston D under the influence of the spring H within the cylinder, the valve E is caused to close the port $d$, while the valve $c^2$ is caused to open the port $c'$ and air is thereby drawn through said port into the cylinder. In passing through the filtering diaphragm $g'$ whatever dust may be in the air is arrested so that it does not get down to the valves and tend to clog their operation. The degree of tire expansion is obtained by varying the projection of the piston rod into the tire so that its outer end will make contact with the tire up to different limits of expansion and not beyond, and thus a hard or a soft tire may be had. This adjustment of the rod may be by screwing it farther into or out of the piston, or by similarly manipulating the foot-piece $f$, but the manner and means I deem best are the encircling holding sleeve I and the adjustment to different distances into said sleeve of the cylinder C, thereby projecting the piston rod more or less. An external winding such as $c^5$ may be used, if required, to hold the cylinder in place.

Having thus described my invention, what I claim as new, and desire to secure by Letters Patent, is—

1. In combination with the rim and pneumatic tire of a wheel, an automatic inflater for the tire consisting of a cylinder flexibly mounted on the wheel whereby it may yield under an unequal strain imposed upon its piston rod, said cylinder having a head with an inlet passage through it, a spring actuated valve in said head, a piston having an interior chamber provided with a spring actuated valve, and a port controlled by said valve, a hollow piston rod communicating with the chamber of the head, and extending into the pneumatic tire and having a vent communicating with its interior, the outer end of said piston bearing against the inner surface of the outer wall of the tire whereby by the compression of the tire against the ground the piston rod and piston are raised, means for adjusting the piston rod to regulate the degree of tire expansion, and a spring within the cylinder for returning the piston.

2. In combination with the rim and pneumatic tire of a wheel, an automatic inflater for the tire consisting of a cylinder having a valve-controlled entrance port, a piston working in the cylinder and having a valve-controlled port, a hollow piston rod connected with the piston and communicating with its port, said piston rod extending into the pneumatic tire to and in contact with its outer wall, and having a vent communicating with its interior, a sleeve flexibly secured to the wheel and in which the cylinder is adjustably fitted whereby the cylinder can yield under an unequal strain imposed upon the piston rod, and the contact of the piston rod with the outer wall of the tire may be varied to regulate the degree of tire expansion, and a spring within the cylinder for returning the piston.

3. In combination with the rim and pneumatic tire of a wheel, the automatic inflater for the tire consisting of the valve-controlled cylinder, the valve-controlled piston therein, the hollow piston rod of said piston communicating with the interior of the tire and bearing against the inner surface of its outer wall whereby it is moved up, a spring within the cylinder for returning the piston and the flexible sleeve connecting the cylinder to the rim of the wheel whereby said cylinder can yield under an unequal strain imposed upon the piston rod.

4. In combination with the rim and pneumatic tire of a wheel, an automatic tire inflater consisting of a flexibly mounted cylinder having a valve-controlled entrance port, a valved piston operating in the cylinder and having the hollow piston rod passing into and bearing against the inner surface of the outer wall of the tire and having a vent by which it communicates with the interior of said tire, and a dust arrester communicating with the entrance port of the cylinder whereby the air is supplied thereto without dust, said dust arrester consisting of a two-part chamber secured on top of the filter and having an air inlet, and the filtering diaphragm traversing said chamber, having its edges clamped between the sections of the chamber.

In witness whereof I have hereunto set my hand.

PHILIP W. STANFORD.

Witnesses:
A. BLOHM,
W. H. VARIEN.